UNITED STATES PATENT OFFICE.

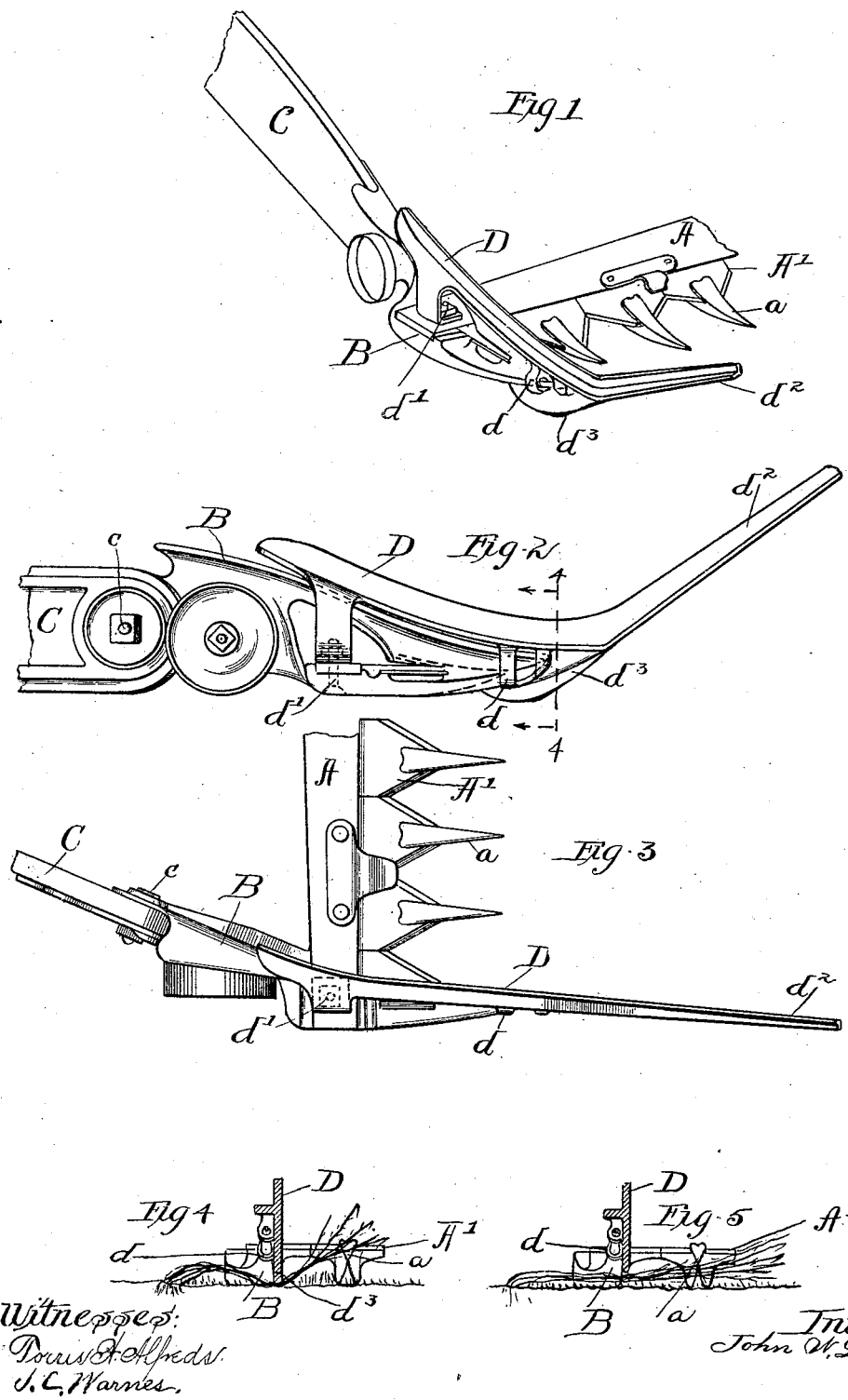

JOHN W. LATIMER, OF CHICAGO, ILLINOIS, ASSIGNOR TO DEERING HARVESTER COMPANY, OF CHICAGO, ILLINOIS.

MOWING-MACHINE.

SPECIFICATION forming part of Letters Patent No. 720,262, dated February 10, 1903.

Application filed November 26, 1902. Serial No. 132,876. (No model.)

*To all whom it may concern:*

Be it known that I, JOHN W. LATIMER, of Chicago, in the county of Cook and State of Illinois, have invented certain new and useful Improvements in Mowing-Machines, of which the following is a specification.

My invention relates to dividers for mowing-machines, and has for its object the furnishing of means that will not only divide and disentangle lodged or fallen grass, but will also so engage the prostrate stalks as to insure their being severed by the cutting apparatus more effectively than heretofore accomplished by any similar device.

I am aware that it is not new to depress the grass in advance of the outer shoe in addition to dividing and disentangling it, and, furthermore, that it is not new to attempt to furnish means to raise and sever prostrate stalks that the grassward end of the cutting apparatus often fails to cut.

In the drawings, Figure 1 is a perspective view of my improvement, showing it attached to the outer end of the finger-bar of a mower. Figs. 2 and 3 are an end elevation and plan, respectively, of same. Fig. 4 is a transverse section on the line 4 4 of Fig. 2, showing how the pressure of the divider on the lodged grass raises the ends sufficiently to permit the guards to pass thereunder and to insure the knife engaging and severing the prostrate grass. Fig. 5 illustrates a similar view, but with no means for so depressing the grass immediately in advance of the line of the points of the guards.

Referring to the drawings, A represents the finger-bar of a mower, $a$ the guards secured thereto, and A' the cutting-blades. B is the outer shoe secured to the said finger-bar, C the grassboard, and $c$ the bolt pivotally securing same to the said shoe.

D is the divider, secured forwardly to the shoe B by a lug $d$ on said divider, which is provided with an aperture adapted to receive the point of the shoe B and secured at the rearward end thereof, preferably by the bolt $d'$.

$d^2$ is an arm of the divider D, projecting forwardly and upwardly from the point of the shoe.

$d^3$ is a rib preferably integral with and projecting downwardly from the divider D at a position somewhat in advance of the line of the points of the guards $a$, the lower edge of said rib being substantially as low as the bottom of the said shoe, said rib extending some distance rearwardly of the line of the points of the said guards. This rib $d^3$, constituting the essential feature of my invention, is placed on the line of the front of the guards and extends forwardly and rearwardly therefrom for reasons hereinafter more fully explained. It may be stated here, however, that the function of the rib is to press the stalks of grass against the yielding soil and raise the ends thereof sufficient to enable the guards to pass under and the cutting apparatus to engage and sever the same. It necessarily follows, therefore, that this rib must be so located relative to the points of the guards that its action upon the fallen stalks over which it passes will cause the said stalks to rise sufficiently to enable the guards by the time they have advanced to them to pass under and permit the cutting apparatus to sever the said stalks. In order that this action may be continued to insure such engagement of the fallen stalks by the cutting apparatus and to further insure stalks lying more or less obliquely with the line of advance of the machine being also engaged by the cutting apparatus, it is necessary that the rib should continue for some distance both rearwardly and forwardly from the line of the point of the said guards.

The operation of the device may be explained as follows: As the cutting apparatus advances in its work the arm $d^2$ will divide more or less completely the "field" from the swath, depending, of course, to what extent the grass has lodged or fallen. The stalks of grass that are completely prostrate or sufficiently so to lie wholly beneath the points of the guards would ordinarily remain uncut; but as the rib $d^3$ presses upon such stalks, tending to bear them down into the soft ground or undergrowth, the ends, and particularly the free ends, will rise sufficient to enable the guards to pass underneath and allow the cutting apparatus to sever them. The action of the rib $d^3$ on fallen stalks is clearly shown in Fig. 4, and the behavior of the down grass in the absence of such rib is shown in Fig. 5. It is a well-known fact that when a resilient body, such as an elastic stick or stalk of grass, is pressed at some point intermediate of its length against a yielding substance, as soft soil, the ends on either side of the point of pressure will tend to rise. Advantage is taken of this fact in my invention. The rib $d^3$, pressing the stalks against the soft soil, will cause them to rise, and thus allow the point of the second guard on the finger-bar to pass under such fallen stalks. This action of the said rib on the grass occurs somewhat in advance of the points of the guards, sufficiently in advance to subject the stalks lying oblique to the line of advance to the action of the said rib before the guard or the point thereof has passed to a point where it will prevent the said stalks from rising, and for the same reason the action of the rib on the prostrate stalks continues after the line of the points of the guards has reached the point of pressure of the rib on the stalks. Other devices pressing the grass to the ground in advance of the shoe have been made, but not, however, with any definite purpose in view, and, in fact, so far as known by me they are so far in advance of the points of the guards that the effect accomplished by me is entirely lost.

What I claim as my invention, and desire to secure by Letters Patent, is—

In combination with the cutting apparatus of a mower having fingers and a reciprocating cutting-blade, an outside shoe provided with a forwardly and upwardly projecting arm, and a rib as one piece with said shoe, said rib extending downwardly substantially to the bottom of said shoe, the forward edge thereof being somewhat in advance of the line of the points of the said guards and extending rearwardly therefrom to a position somewhat in the rear of said line of the points of the said guards, substantially as described.

JOHN W. LATIMER.

In presence of—
J. C. WARNES,
T. H. ALFREDS.